UNITED STATES PATENT OFFICE.

NAPOLEON B. SHAW AND DAVID SHAW, OF SANBORNTON, N. H.

IMPROVED FRICTION-MATCH COMPOSITION.

Specification forming part of Letters Patent No. 49,659, dated August 29, 1865.

*To all whom it may concern:*

Be it known that we, NAPOLEON B. SHAW and DAVID SHAW, of Sanbornton, in the county of Belknap and State of New Hampshire, have invented a new and useful Friction-Match Composition; and we do hereby declare the same and the mode of compounding it to be described as follows:

The composition, preparatory to being applied to match-splints, may be preserved for a great length of time in a liquid state. Thus persons who may possess it can readily make friction-matches for their own or others' use as their necessities may require.

The composition may be put up in bottles for sale, and in such state, provided they may be well corked, will preserve its liquid form.

It has the advantage over a composition made of phosphorus, chalk or whiting, and glue, solely or combined with various other ingredients, as, like such a composition, it does not require to be used immediately after being made, nor is it so liable to harden at the surface or to have a scum rise thereon.

The constituents of the new or improved composition are, by weight, as follows, viz: thirty-two parts of whiting or chalk, sixteen parts of glue or its equivalent, six parts of phosphorus, and thirty-two parts of acetic acid.

In mixing them together, the glue may be dissolved in a portion of the acid and by a gentle heat applied thereto. Phosphorus should next be put into the mixture and be thoroughly incorporated therewith, after which the whiting and the balance of the acid may be added to it and the whole be well stirred together. The mixture will then be ready for use. The acetic acid enables it to maintain its liquid character until applied to the splints, which, after having been duly tipped with sulphur or other proper inflammable equivalent, are to have their ends dipped into the composition, which will soon dry thereon on being exposed to the air.

We do not claim the employment of phosphorus, chalk, and glue in the manufacture of compositions for the making of friction-matches.

What we claim as our invention is—

The new or improved liquid match-composition, made of the materials substantially as described.

DAVID SHAW. [L. S.]
N. B. SHAW. [L. S.]

Witnesses:
EZRA E. CAWLEY,
SARAH J. ROLLINS.